United States Patent
Planque et al.

(10) Patent No.: US 12,261,331 B2
(45) Date of Patent: Mar. 25, 2025

(54) ELECTROCHEMICAL DEVICE COMPRISING AN ELECTROCHEMICAL UNIT DISPOSED IN A CONTAINMENT ENCLOSURE

(71) Applicant: COMMISSARIAT A L'ENERGIE ATOMIQUE ET AUX ENERGIES ALTERNATIVES, Paris (FR)

(72) Inventors: Michel Planque, Grenoble (FR); Charlotte Bernard, Grenoble (FR); Guilhem Roux, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 345 days.

(21) Appl. No.: 17/286,689

(22) PCT Filed: Oct. 22, 2019

(86) PCT No.: PCT/FR2019/052512
§ 371 (c)(1),
(2) Date: Apr. 19, 2021

(87) PCT Pub. No.: WO2020/084249
PCT Pub. Date: Apr. 30, 2020

(65) Prior Publication Data
US 2021/0344022 A1    Nov. 4, 2021

(30) Foreign Application Priority Data
Oct. 26, 2018 (FR) .......................... 1859929

(51) Int. Cl.
*H01M 8/04007* (2016.01)
*H01M 8/2475* (2016.01)

(52) U.S. Cl.
CPC ... *H01M 8/04074* (2013.01); *H01M 8/04037* (2013.01); *H01M 8/2475* (2013.01)

(58) Field of Classification Search
CPC ......... H01M 8/04074; H01M 8/04037; H01M 8/2475; H01M 8/2432; H01M 8/2484;
(Continued)

(56) References Cited

U.S. PATENT DOCUMENTS 5,314,762 A * 5/1994 Hamada ............ H01M 8/04776
429/513
8,945,356 B2    2/2015 Le Gallo et al.
(Continued)

FOREIGN PATENT DOCUMENTS

CH        713 019 A2    4/2018
DE  10 2016 123 649 A1    6/2018
(Continued)

OTHER PUBLICATIONS

International Search Report issued Apr. 3, 2020 in PCT/FR2019/052512 filed Oct. 22, 2019, 3 pages.
(Continued)

*Primary Examiner* — Ula C Ruddock
*Assistant Examiner* — Sarika Gupta
(74) *Attorney, Agent, or Firm* — Oblon, McClelland, Maier & Neustadt, L.L.P.

(57) ABSTRACT

The invention relates to an electrochemical device that includes an electrochemical unit. The electrochemical unit includes a stack of SOEC/SOFC-type solid oxides operating at high temperatures, a clamping system provided with two clamping plates, referred to as the first clamping plate and second clamping plate, respectively, between which the stack is clamped, one and/or both of the two clamping plates having at least one gas inlet and at least one gas outlet. The unit includes heating means which are designed to ensure
(Continued)

the heating of the electrochemical unit and are integrated into said unit. The device includes a containment box, housed in a volume, referred to as internal volume V, the electrochemical unit, the internal volume V being delimited by a surface, referred to as the internal surface S, of the containment box, which follows the shape of the electrochemical assembly.

11 Claims, 10 Drawing Sheets

(58) Field of Classification Search
CPC ......... H01M 8/04052; H01M 8/04067; H01M 8/2457; H01M 8/248; C25B 1/04; C25B 9/73; C25B 9/77; C25B 15/02; Y02E 60/36; Y02E 60/50
See application file for complete search history.

(56) References Cited

U.S. PATENT DOCUMENTS

| | | | |
|---|---|---|---|
| 10,892,511 B2 | 1/2021 | Reytier et al. | |
| 2011/0210012 A1 | 9/2011 | Sioli | |
| 2016/0293980 A1 | 10/2016 | Morikawa et al. | |
| 2018/0138540 A1* | 5/2018 | Kakuwa | H01M 8/2475 |
| 2018/0375144 A1 | 12/2018 | Tingelof | |
| 2019/0229352 A1* | 7/2019 | Junaedi | H01M 8/2425 |

FOREIGN PATENT DOCUMENTS

| | | |
|---|---|---|
| EP | 3 082 188 A1 | 10/2016 |
| EP | 3 322 021 A1 | 5/2018 |
| JP | 2011-76890 A | 4/2011 |
| JP | 2012-506946 A | 3/2012 |
| JP | 2013-38034 A | 2/2013 |
| JP | 2013-105662 A | 5/2013 |
| JP | 2014-232678 A | 12/2014 |
| JP | 2015-49958 A | 3/2015 |
| JP | 2016/516129 A | 6/2016 |
| JP | 2018-73715 A | 5/2018 |
| JP | 2018-85327 A | 5/2018 |
| KR | 10-2018-0019943 A | 2/2018 |
| WO | WO 2015/087913 A1 | 6/2015 |
| WO | WO 2017/102657 A1 | 6/2017 |
| WO | WO 2017/131569 A1 | 8/2017 |
| WO | WO 2018/080570 A1 | 5/2018 |

OTHER PUBLICATIONS

Preliminary French Search Report issued Jul. 31, 2019 in French Patent Application No. 1859929 filed Oct. 26, 2018, 3 pages (with Translation of Category).
U.S. Appl. No. 16/333,299, filed Mar. 14, 2019, 2019-0245224 A1, Vincent Lacroix et al.
U.S. Appl. No. 16/473,809, filed Jun. 26, 2019, 2019-0326621 A1, Michel Planque et al.
U.S. Appl. No. 16/475,836, filed Jul. 3, 2019, 2019-0372137 A1, Michel Planque et al.
U.S. Appl. No. 16/769,876, filed Jun. 4, 2020, Michel Planque.
U.S. Appl. No. 16/758,176, filed Apr. 22, 2020, 2020-0313217 A1, Michel Planque et al.
U.S. Appl. No. 16/954,888, filed Jun. 17, 2020, 2020-0403261 A1, Charlotte Bernard et al.
U.S. Appl. No. 16/872,469, filed May 12, 2020, 2020-0360993 A1, Mathieu Opprecht et al.
Japanese Office Action issued May 7, 2024 in Japanese Patent Application No. 2021-521971 (with English Translation), 17 pages.

* cited by examiner

ELECTROCHEMICAL DEVICE COMPRISING AN ELECTROCHEMICAL UNIT DISPOSED IN A CONTAINMENT ENCLOSURE

CROSS-REFERENCE TO RELATED APPLICATION

The present application is a national stage application of PCT Application No: PCT/FR2019/052512, filed Oct. 22, 2019, which claims priority to French Patent Application No. 18 59929, filed on Oct. 26, 2018. The benefit of priority is claimed to each of the foregoing, and the entire contents of each of the foregoing are incorporated herein by reference.

TECHNICAL FIELD

The present invention relates to the general field of electrochemical devices provided with solid oxide electrochemical cells operating at high temperature.

The present invention particularly relates to an electrochemical device comprising a plurality of electrochemical cells clamped between two clamping plates. The unit formed by the electrochemical cells and the clamping plates also comprises an integrated heating system as well as arrangements intended to enhance the energy performances thereof and particularly the thermal performances thereof.

The device according to the present invention can in particular be used for high-temperature electrolysis or as a fuel cell.

PRIOR ART

FIG. 1 represents an electrochemical device according to the prior art and described in document [1] cited at the end of the description.

The electrochemical device comprises a solid oxide stack operating at high temperature clamped in two clamping plates capable of operating either in electrolyser mode or in fuel cell mode.

The electrochemical device 10 is generally designated by either of the acronyms "SOEC" ("Solid Oxide Electrolyser Cell") or "SOFC" ("Solid Oxide Full Cell") whether it operates, respectively, in electrolyser mode or in fuel cell mode.

The solid oxide stack operating at high temperature, as illustrated in FIG. 2, comprises a stack 200 of elementary electrochemical cells 210 between which interconnectors 230 intended to provide an electrical contact between the elementary electrochemical cells and also to carry out the reagent gas distribution thereof are interposed.

Each elementary electrochemical cell comprises an electrolyte 210e interposed between an anode 210a and a cathode 210c.

Throughout the description of the present application, "anode", "cathode" and "electrolyte" denote elements of generally planar shape, for example in layer form, which comprise two essentially parallel main faces connected by a contour.

The anode and the cathode of each elementary electrochemical cell generally comprise a porous layer, whereas the electrolyte forms a dense and impervious layer.

Each interconnector disposed on either side of an electrochemical cell forms, respectively, with the anode an anodic gas distribution and collection compartment 230a, and with the cathode a cathodic gas distribution and collection compartment 230c.

In operation, the anode and the cathode are the site of electrochemical reactions, whereas the electrolyte enables the transport of ions from the cathode to the anode, or conversely depending on whether the electrochemical cell is operating in electrolyser mode or in fuel cell mode.

Thus in electrolyser mode, the cathodic compartment enables a supply of water vapour and a discharge of water reduction products, particularly hydrogen, whereas the anodic compartment discharges, via a draining gas, the dioxygen produced from the oxidation of $O^{2-}$ ions migrating from the cathode to the anode.

The electrolysis mechanism ("SOEC" mode) of water vapour by an elementary electrochemical cell is illustrated in FIG. 3. During this electrolysis, the elementary electrochemical cell is powered by a current circulating from the cathode to the anode. The water vapour distributed by the cathodic compartment is then reduced under the effect of the current according to the following half-reaction:

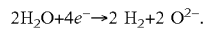

$$2H_2O + 4e^- \rightarrow 2 H_2 + 2 O^{2-}.$$

The dihydrogen produced during this reaction is then discharged, whereas the $O^{2-}$ ions produced during this reduction migrate from the cathode to the anode, via the electrolyte, where they are oxidised into dioxygen according to the half-reaction:

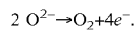

$$2 O^{2-} \rightarrow O_2 + 4e^-.$$

The dioxygen thus formed is for its part discharged by the draining gas circulating in the anodic compartment.

The electrolysis of the water vapour complies with the following reaction:

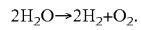

$$2H_2O \rightarrow 2H_2 + O_2.$$

In fuel cell mode ("SOFC"), air is injected into the cathodic compartment which splits into $O^{2-}$ ions. The latter migrate to the anode and react with dihydrogen circulating in the anodic compartment to form water.

Operation in fuel cell mode enables the production of an electric current.

Optimising the operation of such an electrochemical device known from the prior art can however require some constraints.

In particular, it is necessary to have electrical insulation between two successive interconnectors to avoid any risk of short-circuiting the elementary electrochemical cell, but also a satisfactory electrical contact and a sufficient contact area between an elementary electrochemical cell and an interconnector. The lowest possible ohmic resistance is then sought between cells and interconnectors. This is dependent on the facing materials but also on the degree of clamping of the stack.

Moreover, tightness is needed between the anodic and cathodic compartments to avoid any risk of having a recombination of the gases produced inducing a decrease in efficiency and above all the appearance of hot spots damaging the stack. Once again, this tightness is dependent on the design of the seals and the materials used but also on the degree of clamping of the stack.

Finally, it is preferable to have a satisfactory gas distribution both at the inlet and at the recovery of the products to avoid any risk of loss of efficiency, pressure and temperature inhomogeneity in the different elementary units, or redhibitory degradations of the electrochemical cells.

Moreover, in practice such a device is disposed in the enclosure of a furnace 50 so as to keep the latter at a temperature between 600° C. and 1000° C., particularly 800° C. The furnace is for example a high-power furnace provided with heating elements 51 mounted outside the electrochemical device. This configuration does not allow thermal energy to be regulated and distributed uniformly in said device.

High temperature gradients can particularly be observed both in the electrochemical device and in the furnace enclosure.

In operation, non-uniform heating inevitably induces a loss of efficiency of the electrochemical device, and is also a source of thermal stress capable of damaging the latter.

Furthermore, it can be noted that an injection of the gases at high temperature, particularly between 600° C. and 1000° C., both in electrolysis mode and in fuel cell mode, has a certain advantage.

The incoming and outflowing gases in the SOEC or SOFC high-temperature solid oxide stack can be heated prior to the injection thereof into the stack, particularly with a furnace as represented in FIG. 5.

In this regard, the furnace 20 thus includes cold parts PF and hot parts PC, the latter comprising the furnace floor 11, a looped tube 12 to manage the gas inlets and outlets of the electrochemical device.

There are two main techniques for carrying out superheating of the inlet gases in a high-temperature electrolyser cell (SOEC) or fuel cell (SOFC) stack.

As represented schematically in FIG. 5, it is possible to dispose a looped tube 12 wound next to the heating resistors of the furnace 20 in the hot part PC thereof.

The gases are then previously heated to a temperature close to about 500° C. at the exchanger outlet, and then circulate in the looped tube 12 in order to be exposed to the radiation of the heating resistors. This exposure to radiation results in superheating of gases of a temperature of about 300° C. before the latter are injected into the solid oxide stack.

Alternatively, it is possible to pass the gases via an electric heater 30 (FIG. 6) which comprises an inertial mass 31 made of steel, a heating resistor 32 and a gas duct tube 33 wound on the inertial mass 31. Such an electric heater 30 makes it possible to bring the incoming gases GE from 20° C. to a temperature of about 800° C. before the introduction (outflowing gases GS) into the solid oxide stack.

However, these two techniques require a very precise adjustment of the temperature of the gases in order to ensure the proper operation of the electrochemical device.

Moreover, the implementation of superheating according to the principle disclosed in FIG. 5 requires the use of a complex assembly due to the presence of windings, and particularly bending of the looped tubes. The looped tubes increase the volume of the device equally, and furthermore generate difficulties in respect of the overall assembly of the device (passage of the current feeds, thermocouples, etc.).

Furthermore, the looped tube can require a costly and time-consuming treatment in order to prevent pollutions due to the oxidation thereof.

The technique implemented in FIG. 6, for its part, has a size which is not compatible with the current trend of proposing increasingly compact systems.

An aim of the present invention is thus that of proposing an electrochemical device for which the heating of the electrochemical device has an enhanced uniformity compared to devices known from the prior art.

A further aim of the present invention is that of proposing an electrochemical device for which the heating is regulated better than that of a device known from the prior art.

DISCLOSURE OF THE INVENTION

The aims of the present invention are, at least partially, achieved by an electrochemical device comprising:
an electrochemical unit comprising:
an SOEC/SOFC-type solid oxide stack operating at high temperature,
a clamping system provided with two clamping plates called, respectively, first clamping plate and second clamping plate between which the stack is clamped, one and/or the other of the two clamping plates comprises at least one gas inlet and at least one gas outlet;
gas distribution and discharge means intended for the operation of the stack cooperating, respectively, with the at least one gas inlet and the at least one gas outlet,
heating means configured to provide the heating of the electrochemical unit and integrated in said unit;
a containment chamber, housing in a volume, called inner volume V, the electrochemical unit, the inner volume V being delimited by a surface, called inner surface S, of the containment chamber, conforming to the shape of the electrochemical unit, and at a distance D from said unit greater than a predetermined distance Dp, the predetermined distance being adjusted such that in the event of leakage of dihydrogen into the space between the inner surface and the electrochemical unit, the oxidation of said dihydrogen makes it possible to retain an oxygen level greater than 15%, the containment chamber further comprising a heat-insulating material.

The combination of the integrated heating means and an inner surface S conforming to the shape of the electrochemical unit makes it possible to enhance the thermal efficiency of the electrochemical device.

Indeed, the conformity of the inner surface S enables the latter to reflect the heat emitted by the electrochemical unit towards said unit more effectively, and as a result, also makes it possible to consider reduced-power heating means with respect to those conventionally used in this type of applications.

Moreover, this combination also helps homogenise the temperature within the electrochemical unit, and thus enhance the efficiency thereof.

According to one implementation, the containment chamber comprises a floor whereon the electrochemical device rests, walls and a roof, the floor, the walls and the roof being held by removable attachment means rendering the containment chamber dismountable.

According to one implementation, the walls and the roof form two half-shells capable of pivoting about an axis, advantageously perpendicular to the floor, in order to enable the opening of the containment chamber.

According to one implementation, the containment chamber comprises handling means, particularly a hoop provided with a handle.

According to one implementation, the heating means are integrated in one and/or the other of the two clamping plates.

According to one implementation, the heating means comprise a resistive filament.

According to one implementation, the electrochemical unit further comprises two end plates called, respectively, first end plate and second end plate, interposed, respectively, between the first clamping plate and the electrochemical stack, and between the second clamping plate and the electrochemical unit, each of the first and/or second end plate further comprising at least one gas circulation duct cooperating with the gas distribution or discharge duct, the gas circulation duct enabling the circulation of the gases from a first end to a second end prior to the transfer thereof to the electrochemical unit.

The gas circulation duct thus makes it possible to superheat the gases by radiant effect of the heat produced by the electrochemical unit, and thus enhance the performances of the electrochemical device.

According to one implementation, the gas circulation duct comprises a groove formed at one of the faces of the first and/or the second end plate, the groove having convolutions, advantageously, the groove forms a sinusoid.

According to one implementation, the clamping system further comprises at least two tie rods extending from one to the other of the two clamping plates and traversing orifices called clamping orifices formed in each of the plates, the at least two tie rods with clamping means, particularly bolts, to enable the assembly of the two plates with one another.

According to one implementation, the at least two tie rods comprise hollow tubes and cooperate with the gas distribution and/or discharge means, so as to enable the circulation of said gases from one end of a tube to the other end of said tube.

According to one implementation, the device further comprises a high-temperature tight coupling system of the stack for the gas feed and outlet, the coupling system includes:
a collector, comprising at least two collecting ducts for the gas feed and outlet each provided with a collection orifice positioned facing, respectively, the at least one gas inlet and the at least one gas outlet,
at least two seals each placed between each collection orifice and the gas outlet or the gas inlet.

BRIEF DESCRIPTION OF THE DRAWINGS

Further features and advantages will emerge in the following description of an electrochemical device, given by way of non-limiting examples, with reference to the appended drawings wherein:

FIG. 8a is particularly a view along a sectional plane perpendicular to a main face of a clamping plate and cutting the electrochemical assembly, FIG. 8b is a view along a sectional plane parallel with a main face of a clamping plate and cutting said plate;

DETAILED DESCRIPTION OF SPECIFIC EMBODIMENTS

The present invention relates to an electrochemical device 10 provided with an electrochemical unit formed by an SOEC/SOFC-type solid oxide electrochemical stack clamped between two clamping plates and provided with an integrated heating system.

"Clamping plate" denotes a plate of generally planar shape, which comprises two main faces connected by a contour, and which when they are assembled in pairs are intended to maintain the cohesion of a stack of elementary electrochemical cells.

The device according to the present invention comprises a containment enclosure wherein the internal volume houses the electrochemical unit.

In this regard, the internal volume of the enclosure is delimited by an internal surface, conforming to the external shape, and at a distance D greater than a predetermined distance ensuring a minimum dioxygen level in the event of dihydrogen leakage.

The combined use of the containment enclosure and the integrated heating system makes it possible to limit outward radiant losses during the operation of the electrochemical device according to the present invention.

Moreover, the containment enclosure enables superior control of the heating imposed on the stack when it is in operation.

The invention is now described in detail with reference to FIGS. 1 to 12.

The electrochemical device 10 according to the present invention is intended to be used for high-temperature electrolysis ("SOEC" mode) or as a fuel cell ("SOFC" mode).

The electrochemical device 10 comprises an electrochemical unit 100.

Figure 1:
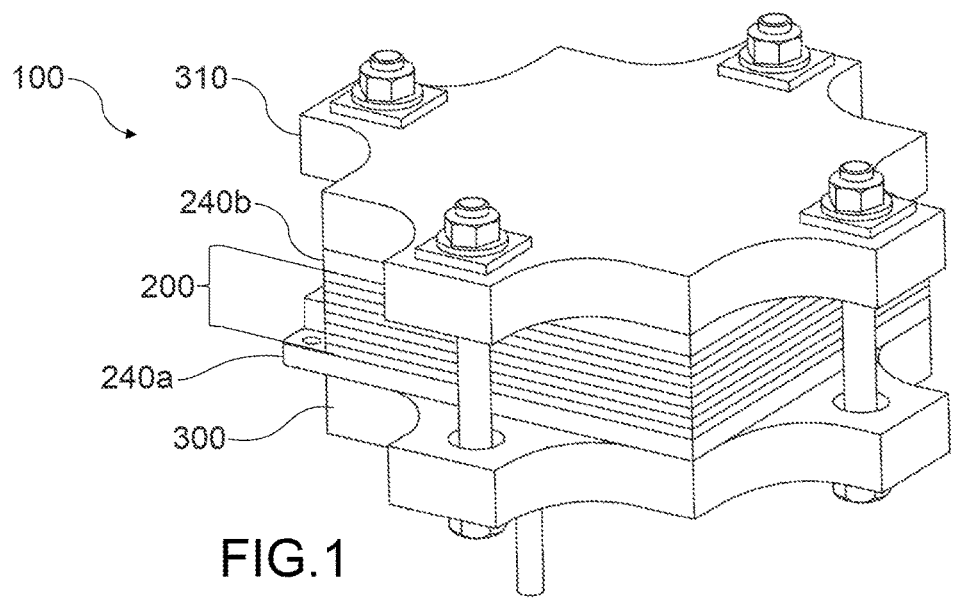
FIG. 1 represents, according to a perspective and partial view, an electrochemical device known from the prior art (FIG. 3 of document [1])
Figure 2:
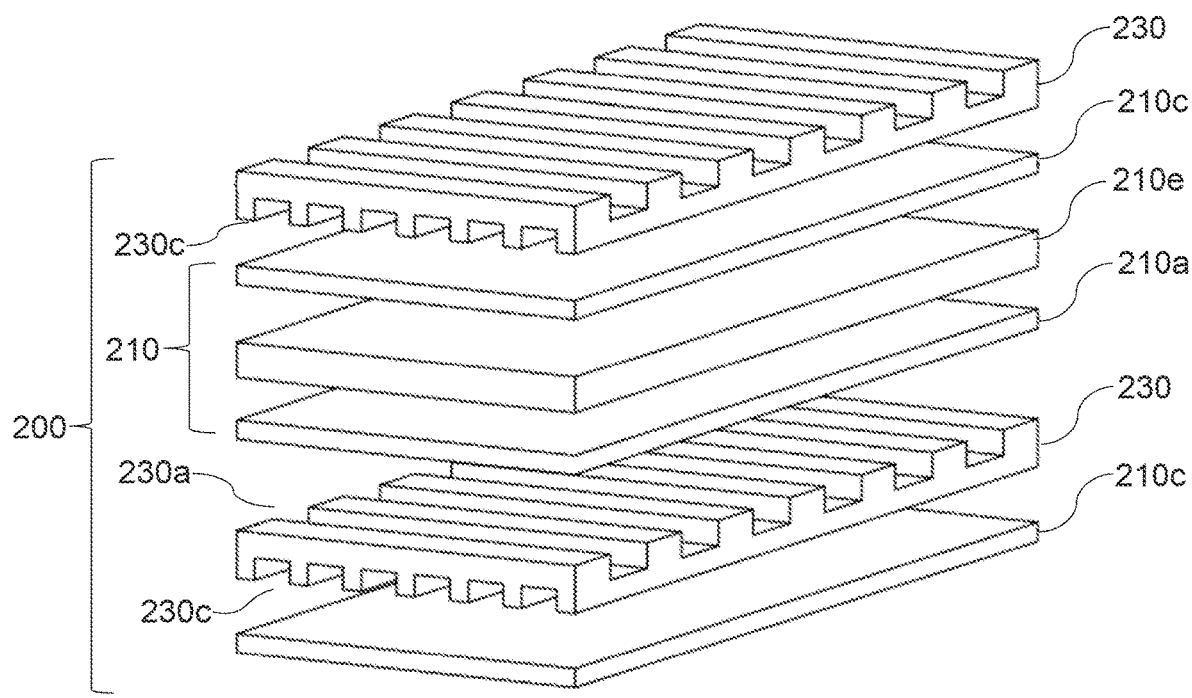
FIG. 2 is an exploded schematic view of a stack of two elementary electrochemical cells known from the prior art and capable of being used within the scope of the present invention.
Figure 3:
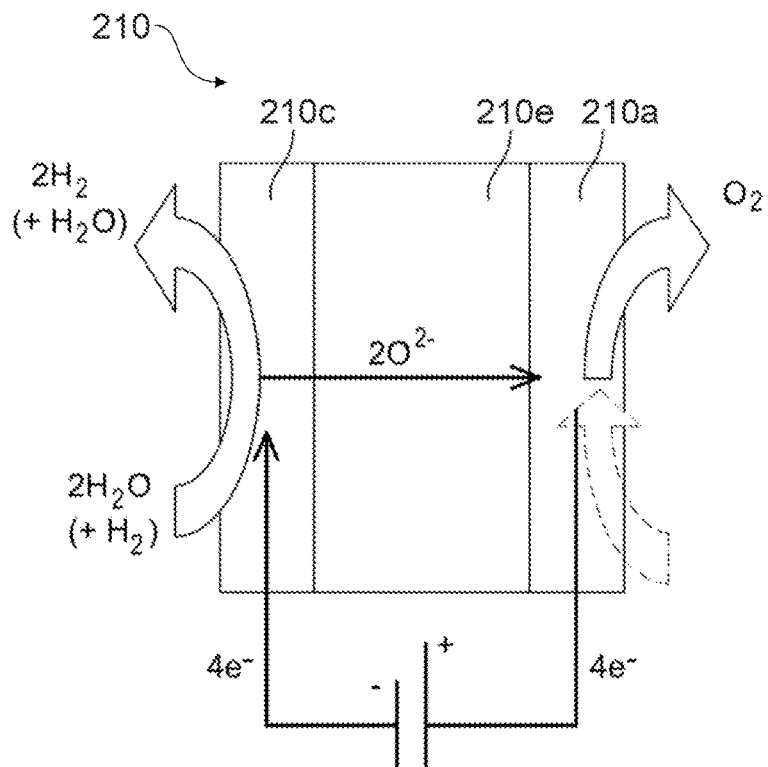
FIG. 3 is a schematic view showing the operating principle of an elementary electrochemical cell in high-temperature solid oxide electrolyser cell (SOEC) mode.
Figure 4:
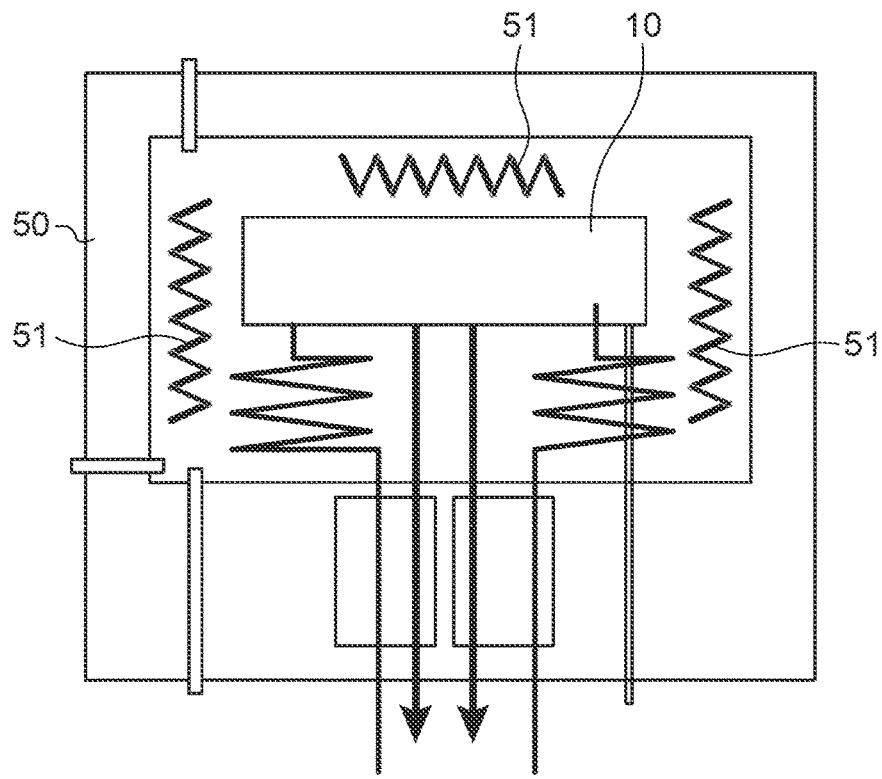
FIG. 4 is a schematic view of an electrochemical device known from the prior art disposed in a furnace.
Figure 5:
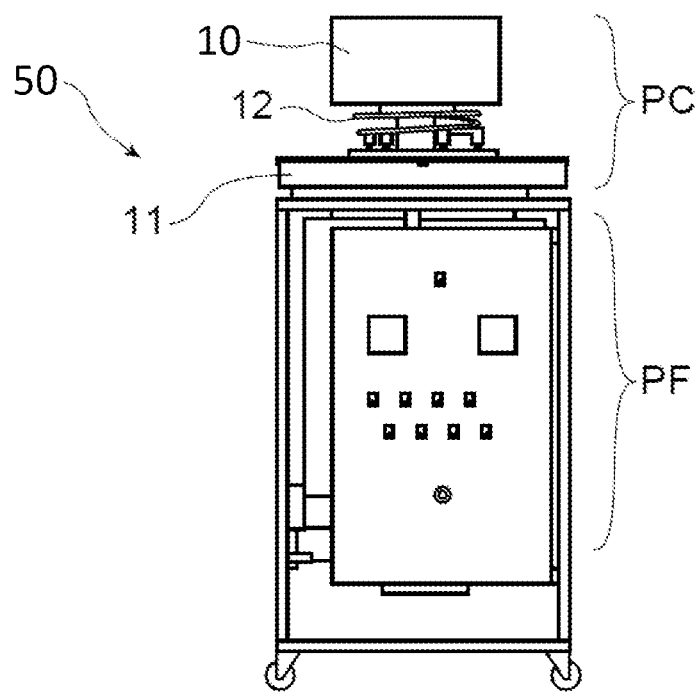
FIG. 5 illustrates the principle of the architecture of a furnace whereon a high-temperature electrolyser cell (SOEC) or fuel cell (SOFC) stack operating at high temperature is placed.
Figure 6:
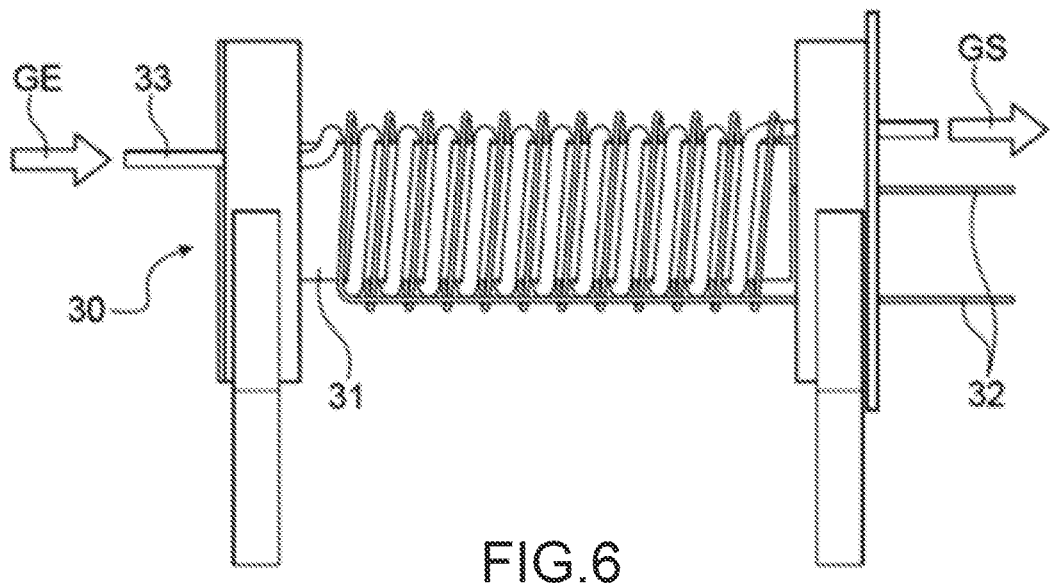
FIG. 6 illustrates the principle of an electric gas heater according to the prior art.

The electrochemical unit 100 is provided with an SOEC/SOFC-type solid oxide stack 200 operating at high temperature (FIGS. 1 and 2); The stack 200 particularly comprises a plurality of elementary electrochemical cells 210 each formed, in the following order, of a cathode 210c, an electrolyte 210e, and an anode 210a.

It is understood, without having to specify it, that "the cathode", "the anode" and "the electrolyte" are of generally planar shape, for example in the form of layers, and comprise two essentially parallel main faces connected by a contour.

In other words, an elementary electrochemical cell 210 is an assembly of ceramic layers, particularly an anode, an electrolyte and a cathode. The electrolyte comprises in this regard a solid and dense conductive ion layer, whereas the anode and the cathode are porous layers.

The stack 200 can also comprise intermediate interconnectors 230, each of the intermediate interconnectors 230 being interposed between two adjacent elementary electrochemical cells 210 (FIG. 2).

The intermediate interconnectors 230 provide an electrical connection between the cathode and the anode of two adjacent elementary electrochemical cells 210.

The intermediate interconnectors all delimit the fluidic compartments at the surface of the electrodes with which they are in contact.

In particular, the face of an intermediate interconnector 230 in contact with an anode 210a of an elementary electrochemical cell 210 delimits a compartment called anodic compartment 230a.

Equivalently, the face of an intermediate interconnector 230 in contact with an cathode 210c of an elementary electrochemical cell 210 delimits a compartment called cathodic compartment 230c.

Each of the anodic 230a and cathodic 230c compartments enables gas circulation, particularly for distributing and collecting said gases.

More particularly, within the scope of an implementation of water electrolysis, the cathodic compartment 230c carries out, at the cathode, a distribution of water vapour and enables the discharge of dihydrogen, whereas the anodic compartment 230a carries out, at the anode, the circulation of a draining gas and discharge of dioxygen.

The electrochemical unit 100 also comprises a clamping system provided with two clamping plates, called respectively, first clamping plate 300 and second clamping plate 310 (FIG. 1).

Each clamping plate comprises two essentially parallel main faces connected by a contour.

In particular, the stack 200 is clamped between the two clamping plates 300, 310.

Means configured to mechanically hold the clamping plates together are also used. The means can particularly comprise tie rods 300t which extend from one of the two clamping plates to the other and traverse orifices called clamping orifices formed in each of the plates.

The tie rods cooperate with clamping means, particularly bolts, to enable the assembly of these clamping plates with one another. These clamping means are, in this regard, described in document [1] cited at the end of the description.

The clamping plates can be made of refractory austenitic steel, in particular AISI 310 type. Alloyed stainless steels are particularly advantageous as they have an excellent resistance to high temperatures. These steels are particularly very resistant to creep and to deformations, and withstand environmental attacks.

The clamping plates 300, 310 can each have a thickness between 20 and 30 mm, particularly of the order of 25 mm.

The clamping plates can comprise at least one gas inlet EG, and/or at least one gas outlet SG. These gas inlets and outlets are for example through holes formed in the clamping plate(s).

The electrochemical unit also comprises gas distribution and/or discharge means 330 intended for the operation of the stack 10a).

The gas distribution and discharge means 330 particularly comprise a duct system for circulating gases, and more generally fluids, and distributing and/or discharging them at the anodes and cathodes of the elementary electrochemical cells.

The gas distribution and discharge means 330 can particularly comprise hollow tubes, partially traversing the electrochemical unit from the at least one gas inlet EG and/or the at least one gas outlet SG. These hollow tubes also comprise lateral openings communicating with the anodic and cathodic compartments so as to carry out the distribution and/or discharge of the gases at said compartments.

Figure 7:
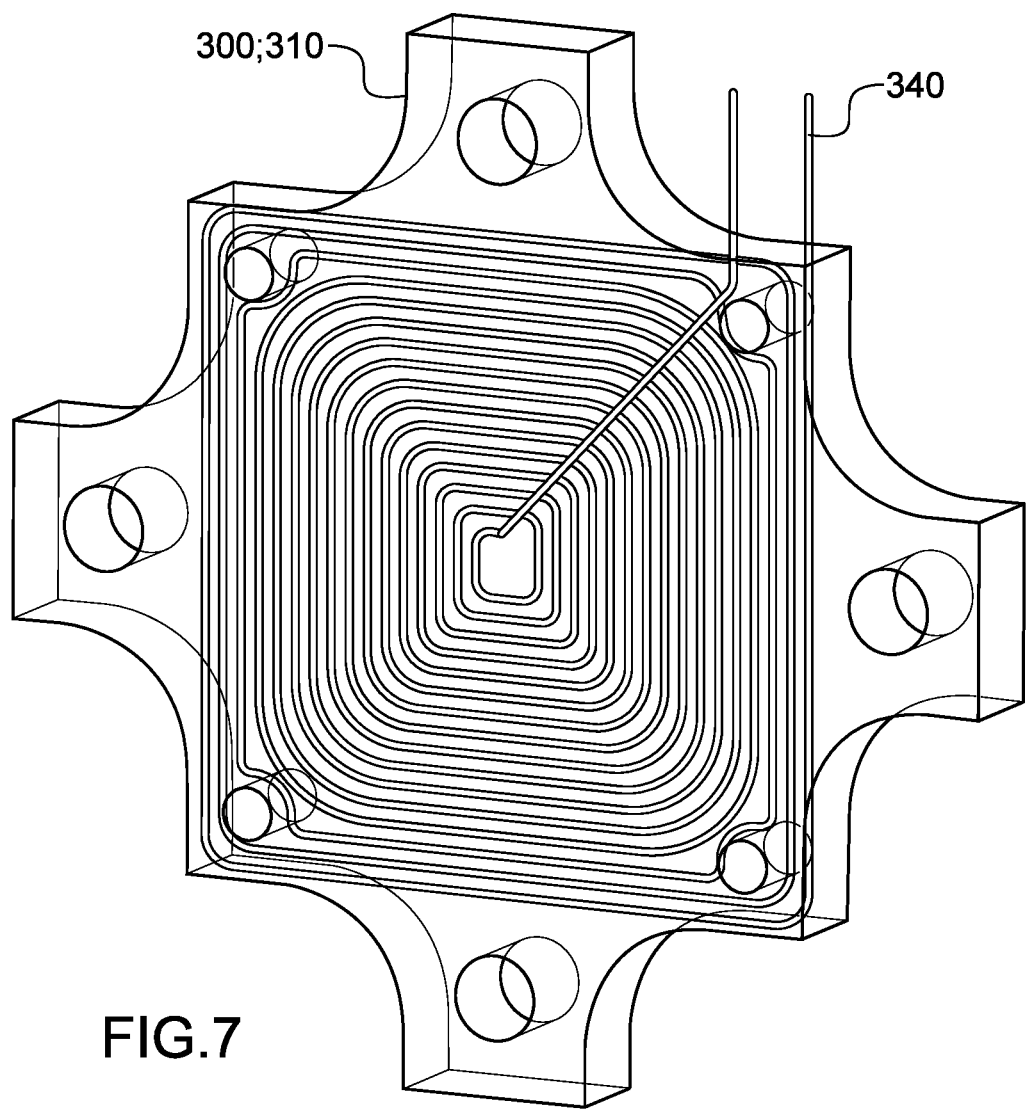
FIG. 7 is a schematic representation of a clamping plate provided with an integrated heating system according to the present invention, the integrated heating system represented in FIG. 7 particularly comprises a resistive filament.
Figure 8A:
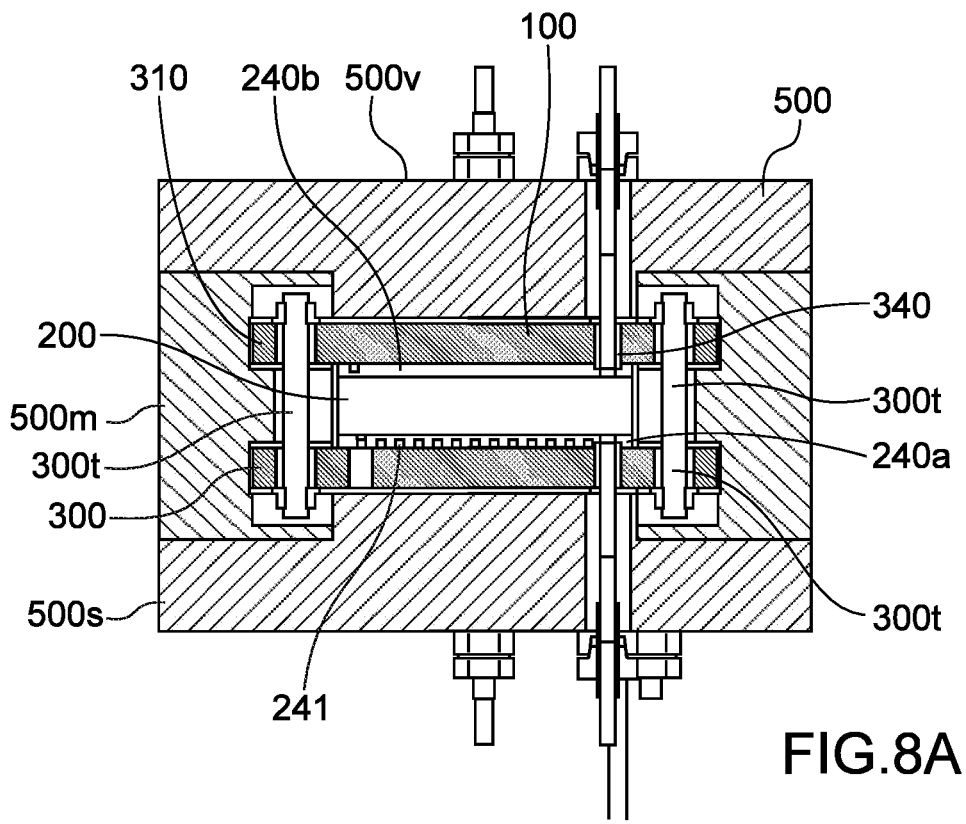
FIGS. 8a and 8b are sectional views of the electrochemical device according to the present invention provided with the containment chamber.
Figure 10A:
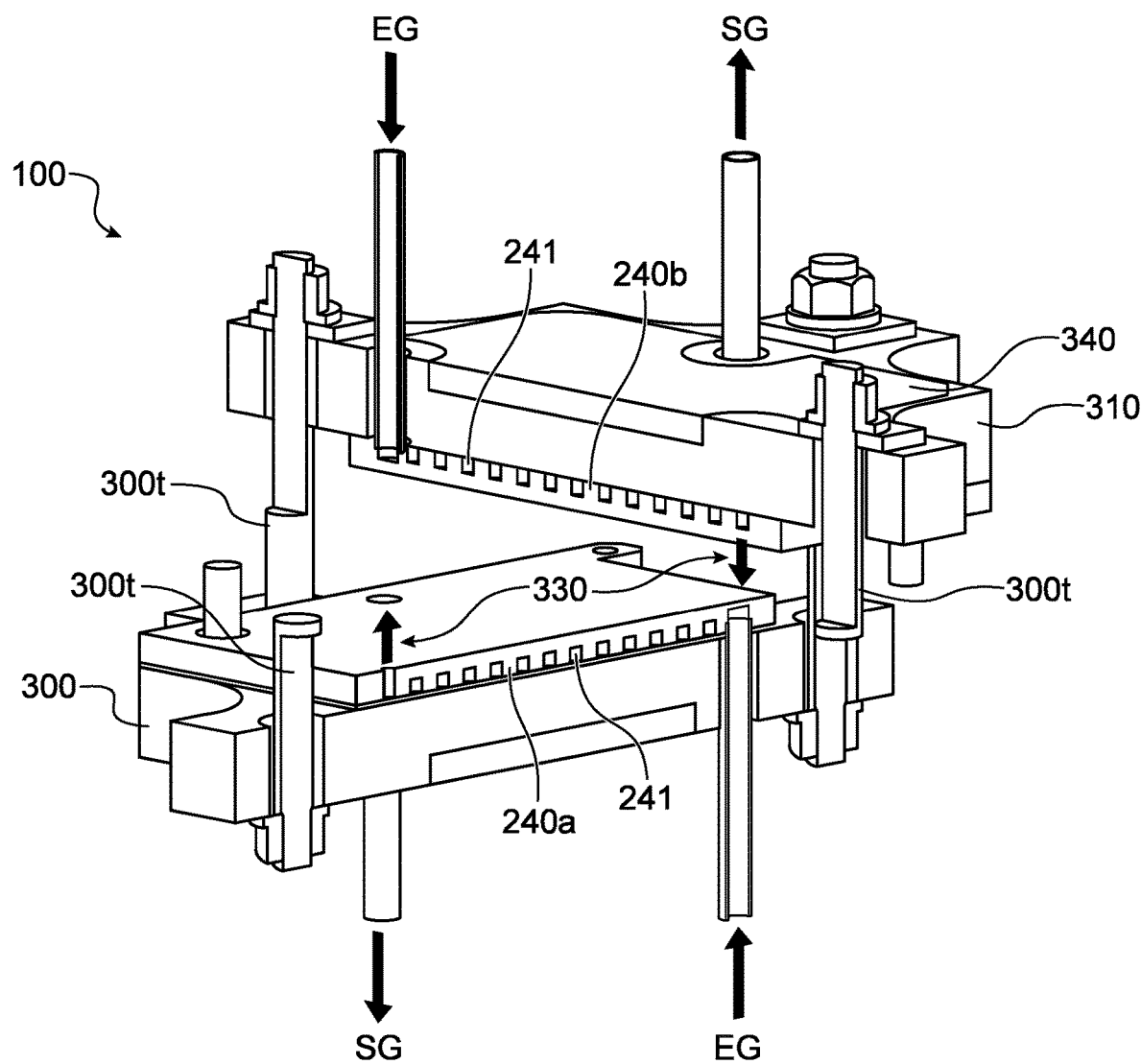
FIG. 10a is a schematic representation, in an exploded view, of an electrochemical unit provided with two end plates, and particularly two end plates each provided with a gas circulation duct.

The electrochemical unit according to the present invention also comprises heating means 340 configured to provide the heating of the electrochemical unit (FIGS. 7, 8a and 10a).

The heating means 340 are integrated in the electrochemical unit.

"Integrated in the electrochemical unit" denotes heating means disposed in the internal volume of the electrochemical unit.

The heating means 340 can particularly comprise a resistive filament disposed on one of the main faces, preferably an internal face, of one and/or the other of the first and the second clamping plate (FIG. 7). The resistive filament of FIG. 7 represents a coil, however any other pattern can be considered.

Figure 8B:
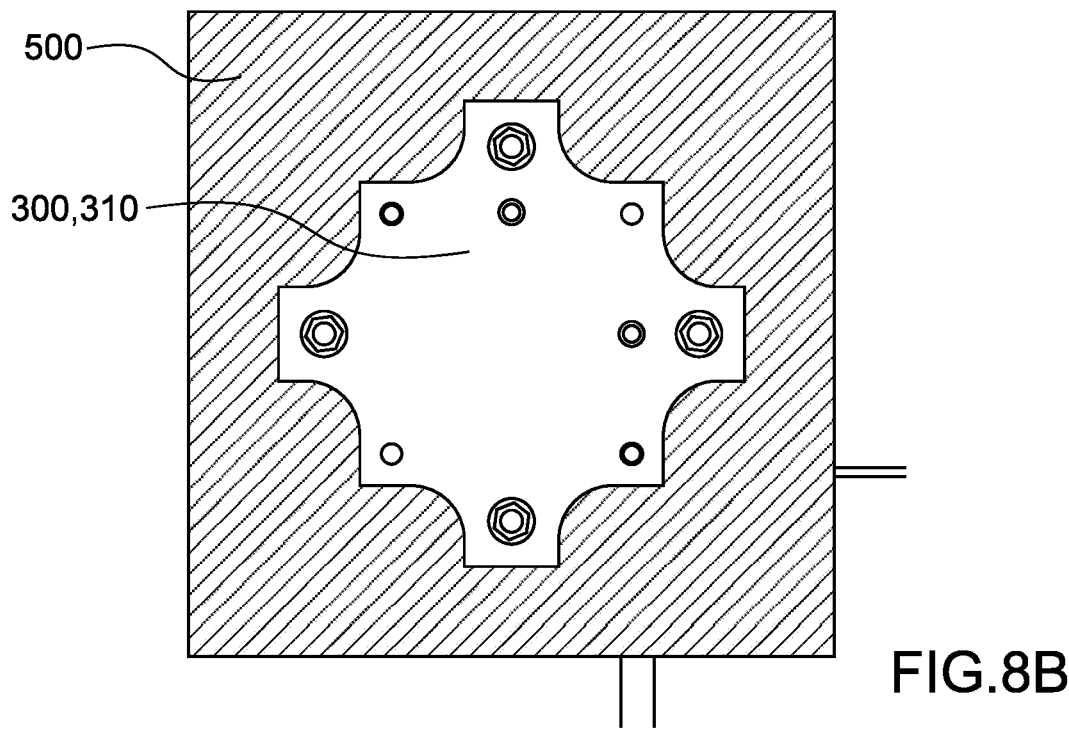
Figure 9:
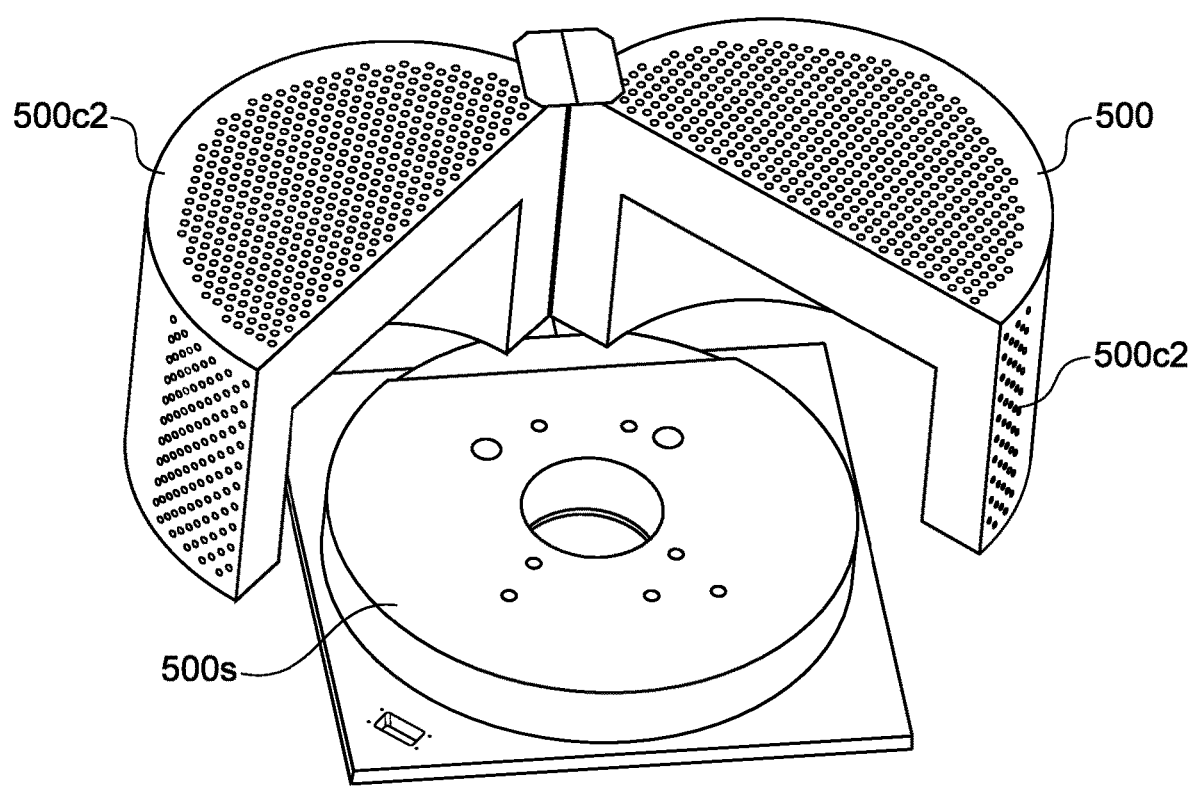
FIG. 9 is a schematic representation according to a perspective view of a containment chamber provided with two half-shells.

The electrochemical device 10 also comprises a containment chamber 500 which houses in the volume V thereof, called inner volume V, the electrochemical unit (FIGS. 8a, 8b and 9).

In particular, the volume V is delimited by a surface S, or inner surface S, essentially conforming to the shape of the electrochemical unit.

"Conforming to the shape of the electrochemical unit" denotes of the same shape without however limiting the dimensions of the inner surface to those of the electrochemical unit. In other words, the inner surface S moulds the shape of the electrochemical unit.

It is understood without having to specify it that the containment chamber is a closed enclosure.

Moreover, the inner surface of S is at a distance D from the electrochemical unit, in particular the distance D can be greater than a predetermined distance Dp The predetermined distance Dp is adjusted such that, in the case of dihydrogen leakage into the space between the internal surface and the electrochemical unit, called free space, the oxidation of said dihydrogen makes it possible to retain an oxygen level greater than or equal to 15%.

This predetermined distance Dp, which is dependent on the ability of the stack to produce dihydrogen, can be determined by techniques known to a person skilled in the art, and is therefore not detailed in the present invention.

For example, the distance D can be less than 10 mm, advantageously between 5 mm and 10 mm.

The free space can also house sensors, such as temperature sensors, hydrogen sensors, pressure sensors, or current feeds.

The containment chamber 500 can comprise a floor 500s whereon the electrochemical device 10, walls 500m and a roof 500v rest.

The floor, the walls and the roof can be held by removable attachment means rendering the containment chamber dismountable.

Additionally or alternatively, the walls and the roof form two half-shells 500c1 and 500c2 capable of pivoting about an axis, advantageously perpendicular to the floor, in order to enable the opening of the containment chamber (FIG. 9).

Also additionally or alternatively, the containment chamber comprises handling means, particularly a hoop provided with a handle.

The combination of a containment chamber and integrated heating means according to the terms of the present invention makes it possible to reduce external thermal losses, and consequently limit the thermal power of heating means required for the proper operation of the electrochemical device.

The inventors observed that this reduction of thermal losses is essentially due to the conformity of the internal surface S with the shape of the electrochemical unit.

Moreover, integrating the heating means in the electrochemical unit makes it possible to ensure superior heating uniformity of said unit.

The containment chamber comprises a heat-insulating material.

"Heat-insulating material" denotes a material which is adapted to limit energy, and particularly thermal, losses. Such a material according to the present invention has a thickness and a thermal conductivity adapted such that the product of these two physical quantities enables a limitation of the thermal losses of the quantity of heat actually produced by the electrochemical unit to 30%.

For example, the creation of losses equivalent to exothermicity (physical or chemical processes producing heat) produced by the electrochemical unit can necessitate that said losses are equal to the total of all the losses, namely the losses at the ducts and/or superheating members, as well as the gas losses. In other words, the exothermicity approximately equal to 30%=Gas losses+Exchanger losses+Insulator losses By way of example, the following table gives the thermal conductivities of different materials, in different temperature ranges, capable of being suitable for use within the scope of the present invention:

| High-temperature insulating materials | Density Kg/m$^3$ | Thermal conductivity (W/mK) | | | Mean application temperature ° C. |
|---|---|---|---|---|---|
| | | 400° C. | 800° C. | 1200° C. | |
| Heat-insulating bricks | 350-700 | 0.12-0.23 | 0.19-0.30 | — | 750-1000 |
| Lightweight refractory bricks | 500-1400 | 0.13-1.30 | 0.17-1.20 | 0.23-1.10 | 1000-1800 |
| Refractory concrete | 400-1400 | 0.13-0.90 | 0.17-0.95 | 0.45-1.00 | 900-1400 |
| Ceramic fibre materials preferred | 64-1500 120-460 | 0.08-0.45 | 0.15-0.45 | 0.29-0.72 | 600-1800 |
| Calcium silicate | 200-1650 | 0.10-0.54 | 0.17-0.49 | — | 1000 |
| Microporous | 150-300 | 0.03 | 0.06 | — | 1000 |
| Mineral wool | 200-800 | 0.12-0.30 | — | — | 650 |
| High-temperature wool | 100-400 | 0.06-0.10 | 0.20-0.25 | — | 500-700 |

In practice, a person skilled in the art will be able to select the material having the lowest thermal conductivity, particularly in the operating temperature range of the electrochemical device. Indeed, the lower the thermal conductivity, the more heat-insulating the material.

By way of example of thermal insulators, it can be considered to use at least one of the materials comprising alkaline earth silicate wools ("AES" or "Alkaline and Alkaline Earth Silicate").

Satisfactory containment can be provided by a containment chamber having a thickness between 200 mm and 300 mm.

As a general rule, for the selection of a high-temperature insulator, the following features can be considered for selecting the high-temperature insulator:
the maximum, minimum, peak and continuous temperatures to which the insulator will be subjected;
the mechanical stress (compression, vibration, etc.) to which the insulator will be subjected;
the chemical stress to which the insulator will be subjected;
the type of environment wherein the insulator is located;
the geometry, tolerances, planes of the containment chamber.

The material forming the containment chamber can also be adapted to limit water vapour diffusion. In particular, the material can have a thickness and a water vapour diffusion coefficient adapted so that the product of these two quantities makes it possible to limit water vapour diffusion.

It can also be considered to use a water vapour diffusion barrier.

This barrier can comprise a first ceramic, for example alumina, enclosure, and of a thickness between 0.25 mm and 2 mm for example disposed between the containment chamber and the electrochemical unit. This first chamber would have the following properties:
a non-porous barrier;
resistant to high temperatures;
a very high resistance to corrosion, to mechanical abrasion and to wear;
a relatively light weight;
an extreme hardness;
a low heat capacity;
a high mechanical strength;
a high flexibility of thin substrates.

An alternative solution could consist of coating the internal surface of the containment chamber with alumina in liquid form (called ceramic mortar, or moulding or coating ceramic).

This solution is particularly advantageous since it makes it possible to coat complex shapes such as the inner surface of the containment chamber. Said surface can be coated using a brush or a spatula. Such a coating can dry in ambient air or in a furnace.

These solutions thus propose a composite insulator composed of a thick layer to produce the thermal barrier, and a thinner layer to limit water vapour diffusion.

By way of example, the following table lists the water vapour diffusion resistances of some materials capable of being suitable for use within the scope of the present invention:

| Mineral wool | | 1.1-1.8 | |
|---|---|---|---|
| Expanded cork | | 4.5-29 | |
| Impregnated expanded cork | | 9-46 | |
| Expanded polystyrene | | 15-150 | |
| Extruded polystyrene with surface skin | | 115-300 | |
| Polyurethane foam | | 23-185 | |
| Pure expanded perlite | 50-80 kg/m$^3$ | 1.5 | |
| Expanded perlite panels | 170 kg/m$^3$ | 7 | 5 |
| Pure expanded vermiculite | 80-100 kg/m$^3$ | 1.5 | |

-continued

| Expanded vermiculite panels | 350 kg/m³ | 8 |
| Cellular sheet glass | | 70,000-infini |
| Cellular glass granules | | 1.5 |

It is also understood, without having to specify it, that the material forming the containment chamber has a thermal resistance enabling it to limit any degradation of said chamber when it is subjected to high temperatures and particularly the operating temperatures of the electrochemical unit.

Among the materials capable of being suitable, alkaline earth silicate (or "AES") wools seem to be materials of choice.

The electrochemical unit can also comprise end plates, called, respectively, first end plate 240a and second end plate 240b disposed on either side of the stack 100 (FIGS. 1, 8a and 10a).

In particular, the first end plate 240a and the second end plate 240b, are interposed, respectively, between the first clamping plate and the electrochemical stack, and between the second clamping plate and the electrochemical stack.

Figure 10B:
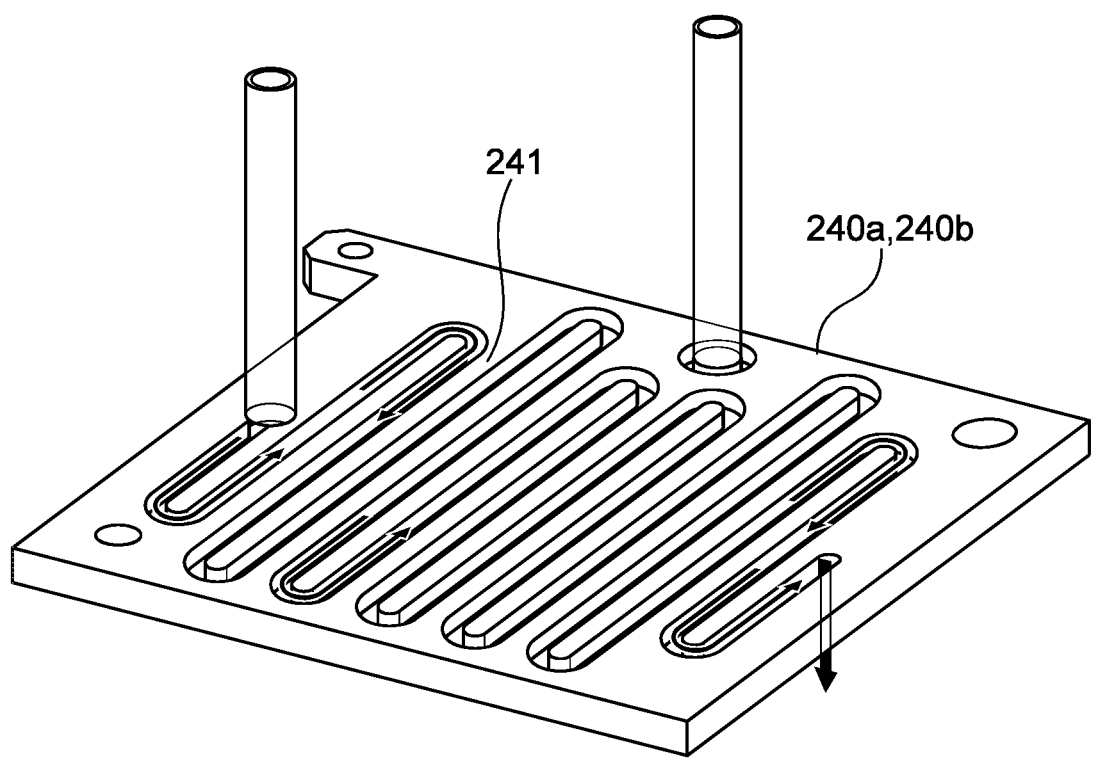
FIG. 10b is a schematic representation, in a perspective view, of an end plate provided with a gas circulation duct.

Each of the first and/or second end plate can comprise at least one gas circulation duct 241 cooperating with the gas distribution or discharge duct, the gas circulation duct enabling the circulation of the gases from a first end to a second end before the transfer thereof to the electrochemical unit (FIGS. 8a, 10a and 10b).

The gas circulation duct 241 comprises a groove formed at one of the faces of the first and/or the second end plate, the groove having convolutions, advantageously, the groove forms a sinusoid.

Such a configuration makes it possible to perform superheating of the gases before the distribution thereof at the cathodes and anodes of the different elementary electrochemical cells.

Indeed, in operation the electrochemical device, and particularly the elementary electrochemical cells produce heat capable of radiating in the direction of the end plates. Such a radiated thermal energy can then advantageously contribute to the superheating of the gases circulating in the gas circulation duct.

Such a superheating system essentially contains the features of the superheating system described in French patent application [2], cited at the end of the description and referenced by the application number thereof. This document [2] is, in this regard, incorporated by reference in the present application.

Figure 11:
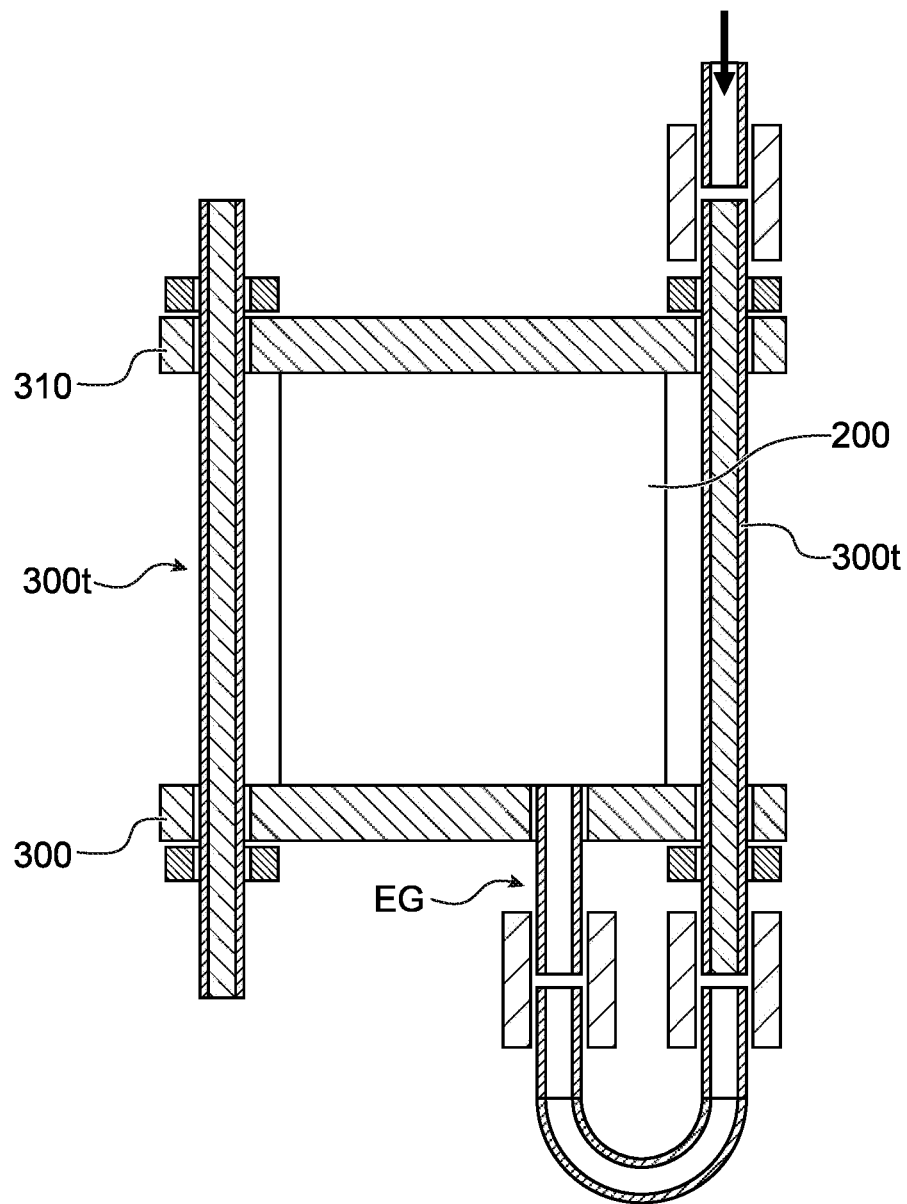
FIG. 11 is a schematic representation of an electrochemical device provided with hollow tie rods intended for gas circulation.
Figure 12:
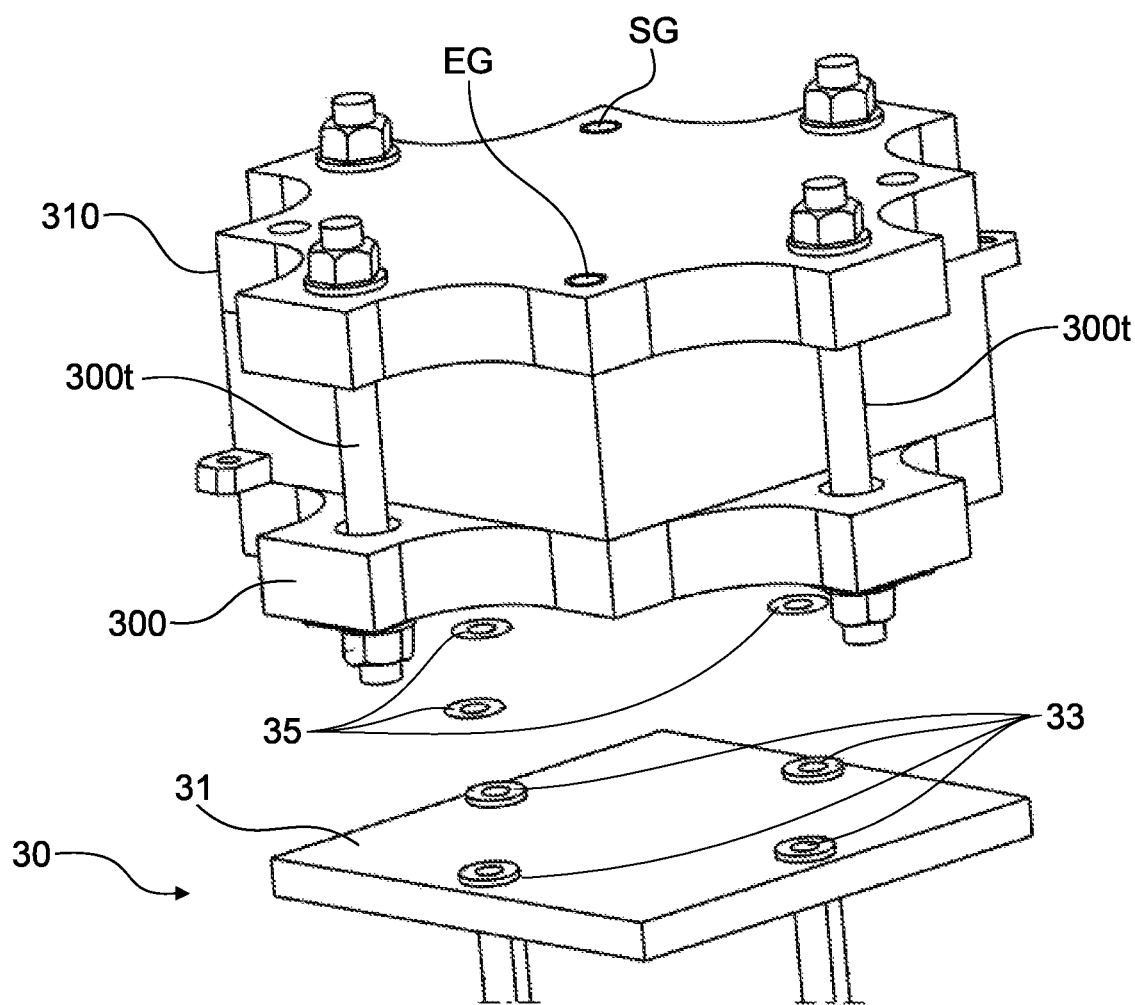
FIG. 12 is a schematic representation of an electrochemical device according to the present invention illustrating the coupling with a coupling system according to the present invention.

Additionally or alternatively to the gas circulation duct described above, the electrochemical device can also comprise a gas duct formed by the tie rods 300t. In particular, the tie rods can comprise hollow tubes cooperating with the gas distribution and discharge means so as to enable the circulation of said gases from one end to the other end of said tube (FIG. 11).

Thus, a gas circulating in the tie rods, during an operation phase of the electrochemical device, can be heated, or superheated, by radiating the heat produced by the elementary electrochemical cells before being introduced into the gas distribution and/or discharge means.

It is possible to increase the thermal exchange time between the gas circulating in a given tie rod, and the radiated thermal energy, by positioning baffles on the inner surface of said tie rods.

Such a superheating system essentially contains the features of the superheating system described in French patent application [3], cited at the end of the description and referenced by the application number thereof. This document [3] is, in this regard, incorporated by reference in the present application.

The device can further comprise a high-temperature tight coupling system of the stack for the gas feed and outlet, the coupling system 30 comprises (FIG. 12):
- a collector 31, comprising at least two collecting ducts for the gas feed and outlet each provided with a collection orifice 33 positioned facing, respectively, the at least one gas inlet EG and the at least one gas outlet (SG),
- at least two seals 35 each placed between each collection orifice 33 and the gas outlet or the gas inlet.

Such a tight coupling system essentially contains the features of the tight coupling system described in French patent application [4], cited at the end of the description and referenced by the application number thereof. This document [4] is, in this regard, incorporated by reference in the present application.

This coupling system enables quick coupling between the electrochemical device and a gas supply. The coupling is made particularly at one of the clamping plates.

The proposed arrangements of the electrochemical device according to the terms of the present invention can be considered individually and collectively. Considering a containment enclosure and an integrated heating system makes it possible to produce a compact electrochemical device having an enhanced thermal efficiency compared to the devices known from the prior art.

Moreover, the containment enclosure can be adapted to enable stacking, or the integration of several electrochemical devices in "rack" form.

REFERENCES

[1] FR 3 045 215;
[2] FR 1760114;
[3] FR 1760106;
[4] FR 1762507.

The invention claimed is:
1. An electrochemical device comprising:
an electrochemical unit having a shape, and
a containment chamber housing the electrochemical unit in an inner volume, the inner volume being delimited by an inner surface of the containment chamber, said inner surface conforming with the shape of the electrochemical unit,
wherein said electrochemical unit comprises:
  an SOEC/SOFC-type solid oxide stack operating at high temperature,
  a clamping system provided with two clamping plates including a first clamping plate and a second clamping plate between which the stack is clamped, at least one of the first and second clamping plates comprises at least one gas inlet and at least one gas outlet;
  gas distribution and discharge means for operation of the stack cooperating, respectively, with the at least one gas inlet and the at least one gas outlet, and
  heating means configured to provide the heating of the electrochemical unit, said heating means being disposed in an internal volume of said electrochemical unit so as to be integrated in said electrochemical unit,
wherein the containment chamber comprises a floor whereon the electrochemical device rests, walls, and a roof, and wherein a space between the inner surface of the containment chamber and a periphery of the electrochemical unit is between 5 mm and 10 mm.

2. The electrochemical device according to claim 1, wherein the floor, the walls, and the roof are held by removable attachment means rendering the containment chamber dismountable.

3. The electrochemical device according to claim 2, wherein the walls and the roof form two half-shells configured to pivot about an axis, perpendicular to the floor, in order to enable an opening of the containment chamber.

4. The electrochemical device according to claim 1, wherein the containment chamber comprises handling means.

5. The electrochemical device according to claim 1, wherein the heating means are integrated in at least one of the first and second clamping plates.

6. The electrochemical device according to claim 5, wherein the heating means comprise a resistive filament.

7. The electrochemical device according to claim 1, wherein the electrochemical unit further comprises two end plates including a first end plate and a second end plate, interposed, respectively, between the first clamping plate and the stack, and between the second clamping plate and the electrochemical unit, at least one of the first end plate and second end plate further comprising at least one gas circulation duct cooperating with the gas distribution or discharge duct, the gas circulation duct enabling the circulation of the gases from a first end to a second end prior to the transfer thereof to the electrochemical unit.

8. The electrochemical device according to claim 7, wherein the gas circulation duct comprises a groove formed at a face of the at least one of the first end plate and the second end plate, the groove having convolutions, the groove forms a sinusoid.

9. The electrochemical device according to claim 1, wherein the clamping system further comprises at least two tie rods extending from the first clamping plate to the second clamping plate and traversing clamping orifices formed in each of the first and second clamping plates, the at least two tie rods with clamping means, to enable an assembly of the first and second clamping plates with one another.

10. The electrochemical device according to claim 9, wherein the at least two tie rods comprise hollow tubes and cooperate with the gas distribution and discharge means, so as to enable the circulation of gases from a first end of said tubes to a second end of said tubes.

11. The electrochemical device according to claim 1, wherein the device further comprises a high-temperature tight coupling system of the stack for the gas feed and outlet, the coupling system includes:
 a collector, comprising at least two collecting ducts for the gas feed and outlet each provided with a collection orifice positioned facing, respectively, the at least one gas inlet and the at least one gas outlet,
 at least two seals each placed between each collection orifice and the gas outlet or the gas inlet.

* * * * *